United States Patent

[11] 3,559,881

[72] Inventor Richard L. Maison
 6624 Forum St., San Diego, Calif. 92111
[21] Appl. No. 759,620
[22] Filed Sept. 13, 1968
[45] Patented Feb. 2, 1971

[54] NOMOGRAM COMPUTER
 19 Claims, 12 Drawing Figs.

[52] U.S. Cl. ................................................. 235/61, 235/89
[51] Int. Cl. ................................................. G06c 3/00
[50] Field of Search ........................................ 235/61B, 89, 61A

[56] References Cited
UNITED STATES PATENTS

| | | | |
|---|---|---|---|
| 1,488,190 | 3/1924 | Bloch | 235/61 |
| 2,635,806 | 4/1953 | Lermer | 235/61 |
| 2,800,279 | 7/1957 | Hekster | 235/61 |
| 3,132,800 | 5/1964 | Berger | 235/61 |
| 3,436,012 | 4/1969 | Stephenson | 235/61 |

FOREIGN PATENTS

| | | | |
|---|---|---|---|
| 359,862 | 9/1921 | Germany | 235/61 |
| 699,744 | 11/1953 | Great Britain | 235/61 |
| 494,201 | 5/1954 | Italy | 235/61 |
| 68.064 | 7/1944 | Norway | 235/61 |

OTHER REFERENCES

Mechanical Engineers' Handbook, Lionel S. Marks, 5th Edition, January 1951, McGraw-Hill, pp. 171— 177

Primary Examiner—Richard B. Wilkinson
Assistant Examiner—Stanley A. Wal
Attorney—William H. Maxwell ABSTRACT: An instrument for solving mathematical problems and involves nomograms that enable the manipulation of a straight line to read off the value of a dependent variable when the value of an independent variable is given, thereby computing by means of graphic representation systemmatic solutions to said problems capable of numerical calculation. With this invention there are immovable scales and it is the calculating line that is moved by manipulation to intersect the said scales at read-off points where memory indicators are positioned for reference, there being a plurality of calculating lines and a multiplicity of memory indicators operable at each and/or both sides of the instrument, which is accordingly capable of the basic mathematics of addition, subtraction, multiplication and division, and also other functions such as subjection of variables to roots, exponents and reciprocals.

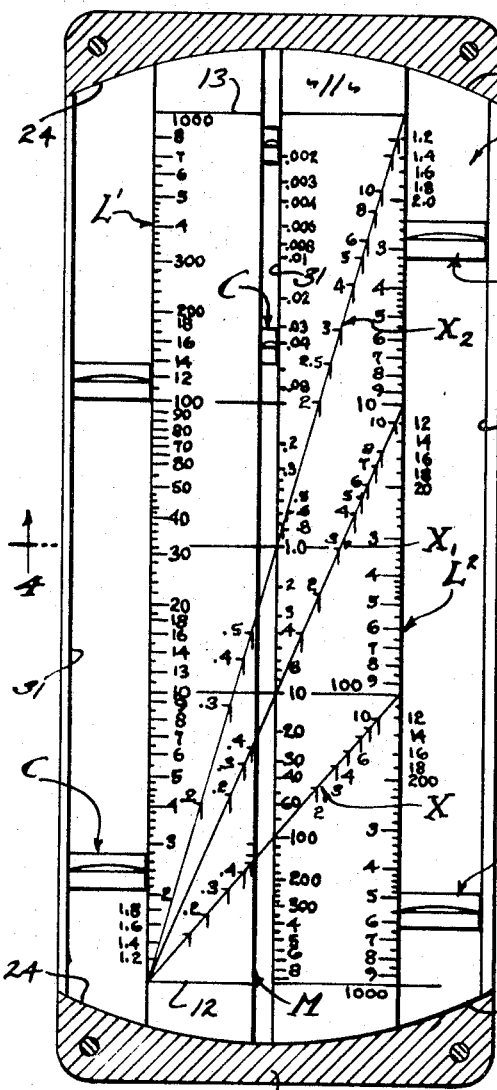
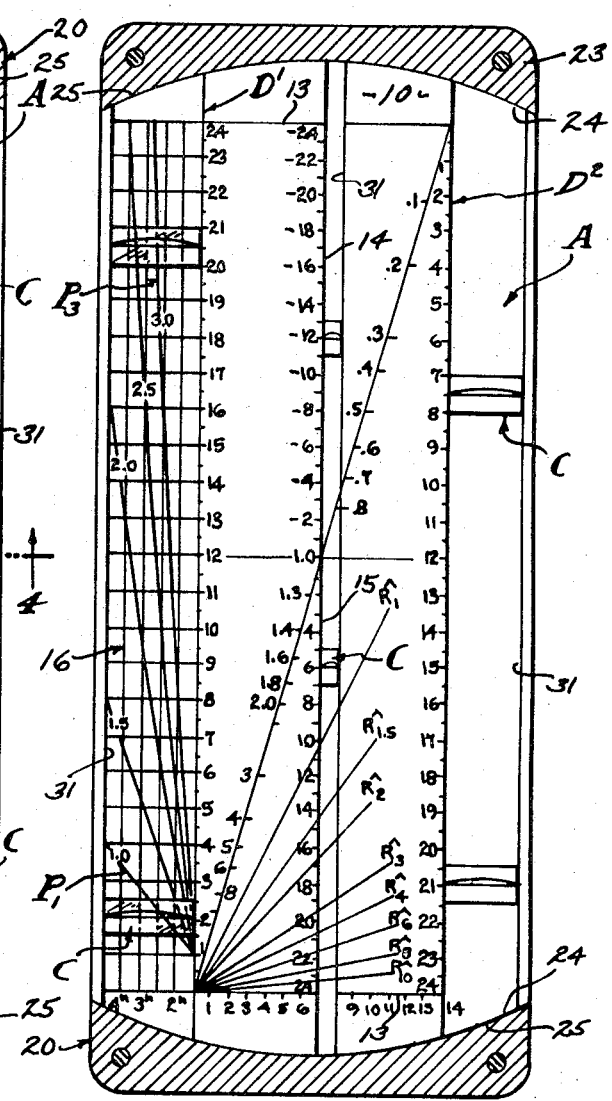
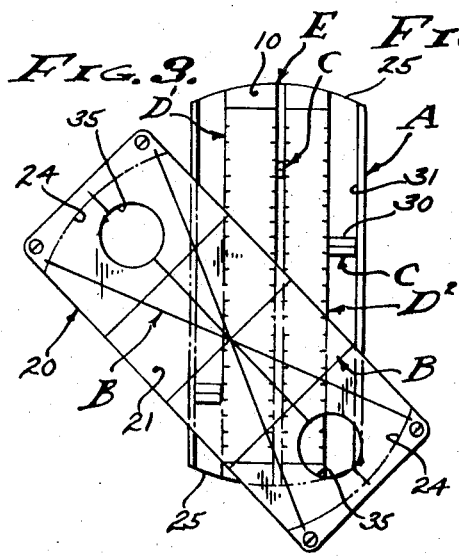
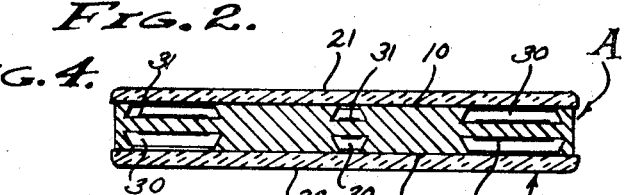
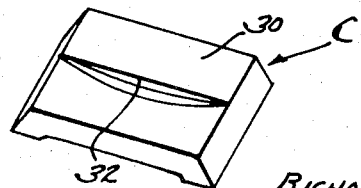
INVENTOR.
RICHARD L. MAISON

INVENTOR.
RICHARD L. MAISON

NOMOGRAM COMPUTER

The prior art relating to instruments for solving mathematical problems provides, for the most part, slide rules and the like which, are limited to one entry per scale and devoid of memory means when locating subsequent variables, are not capable of simple addition and subtraction functions, and are lacking in means to aid the operating person in retaining perspective of the problem functions as they develop and are solved. It is a general object of this invention, therefore, to provide an instrument of the character referred to that provides for the entry of a plurality of read-off points, that provides for addition and subtraction as well as multiplication and division; and that provides for a multiplicity of memory points, all as circumstances require.

The prior art relating to computers is by its very nature complex, requiring memory banks and language conversion and reconversion. Consequently, special skills must be resorted to when using computer equipment, accompanied by the extreme expense of the equipment, and all of which is complicated by immobility and nonavailability. Therefore, a simple and portable graphic instrument is much to be desired and it is an object of this invention to provide such an instrument, particularly adapted to personal use.

It is an object of this invention to provide a unique combination and positioning of scales in a nomogram computer so as to provide for the solution of all basic mathematical problems. With the present invention three basic nomograms are combined into the one instrument, one adapted to operate with respect to addition and subtraction problems, a second adapted to operate with respect to multiplication and division problems, and a third adapted to operate proportionately with respect to either of the said one and second nomograms.

It is still another object of this invention to provide the combination with means to operate with respect to powers, providing a grid of coordinate lines associated with power lines to each root represented.

It is still another object of this invention to provide for the sequential operation with higher numerical decimal divisions, and to this end the instrument is manifold, threefold as shown, for this purpose.

The various objects and features of this invention will be fully understood from the following detailed description of the typical preferred form and application thereof, throughout which description reference is made to the accompanying drawings, in which:

FIGS. 1 and 2 are face elevations respectively, FIG. 1 showing one side face of the instrument and FIG. 2 showing the other side face of the instrument;

FIG. 3 is a view of reduced size, similar to FIGS. 1 and 2, and illustrating the manner in which the case is manipulated to place the calculating line as circumstances require;

FIG. 4 is a transverse sectional view taken as indicated by line 4–4 on FIG. 1;

FIG. 5 is a perspective view showing the nature of the memory indicators; and,

Figure 6:
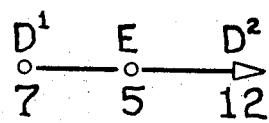
FIGS. 6 through 12 are graphic diagrams illustrating the mathematical operation of the instrument.

The nomogram computer is shown throughout the drawings as an instrument having fixed immovable scales relative to which calculating lines are manually positioned and along which memory indicators are placed. The instrument therefore involves, generally, a body A, nomographic scales as will be hereinafter described, one or more calculating lines B, and one or more memory indicators C. The instrument body A is a planar solid having opposite faces 10 and 11 (see FIGS. 1 and 2) upon which the basic nomograms are disposed for observation. Since the instrument is manifold, that is to have sequential decimally adjacent areas, the body A is elongated, in which case the individual characteristically square nomograms are cooperatively related into a composite and continuing rectangular nomogram. With respect to continuity and interdependency of adjacently related nomograms, it is to be observed that there are various nomograph scales thereof which continue throughout the three (or more) nomograms shown, whereby the operable functions of one area depend upon the operable functions of remote and interrelated areas.

The opposite faces 10 and 11 are associated with the operative functions of addition-subtraction and multiplication-division, respectively. Consequently, the nomographic scales at said two faces are fundamentally distinct, but nevertheless related so as to be similarly operative for selective placement thereon of the calculating line B drawn through two variable points so as to intersect a read-off point. Accordingly, the opposite faces 10 and 11 might have a similar appearance to the indiscriminate observer; however the face 10 is inscribed with linear invertedly related scales $D^1$ and $D^2$ and with a linearly divided control scale E, while the face 11 is inscribed with logarithmic invertedly related scales $L^1$ and $L^2$ and with a dual range control scale M. In both instances the scales $D^1$, $D^2$ and E, and the scales $L^1$, $L^2$ and M are equally spaced and parallel, extending longitudinally of the body A with the scales E and M intermediate. In practice therefore, there are normally disposed base lines 12 and 13 at each end of the instrument body and between which the scales coextensively extend, being of equal extent.

The linear nomogram at face 10 accommodates a wide variety of mathematical problems and equations involving addition, subtraction, multiplication and division. The scales $D^1$, $D^2$ and E are divided into equal increments; scale $D^1$ increasing numerically as it extends from base line 12 to base line 13 and scale $D^2$ increasing numerically as it extends from base line 13 to base line 12. The control scale E comprises two equal portions 14 and 15 having a base or zero point at its center and increasing numerically therefrom and in opposite directions toward the base lines 12 and 13. In practice, the numerical extent of the scales $D^1$, $D^2$ and E can vary, and as illustrated extend from zero to 24 in each of the four instances. The divided control scale E graduations are half that of the scales $D^1$ and $D^2$ graduations, and the upper portion 14 is of negative value while the lower portion 15 is positive. In accordance with the invention, and in order to multiply and divide on the face 10, a proportionate control scale F connects the zero points of the scales $D^1$, $D^2$ and E, the control scale F being a straight line of necessity and increasing numerically from zero at base line 13 and the zero of scale $D^2$ to a value of 1 at the zero of scale E, and to a value of infinity at base line 12 and the zero of scale D.

The linear nomogram at face 10 includes the inscription thereon of a family of reciprocal lines $R_1$, $R_{1.5}$ and $R_2$ through $R_{10}$ which radiate at proportionate ratio angles from the intersection point of the scale $D^1$ and the base line 12. In accordance with the invention the said base line 12 is scaled linearly from scale $D^1$ to scale $D^2$, and the family of radial lines spread from the value of one over infinity at coincidence with the scale $D^1$, to the value of infinity at coincidence with the base line 12. The addition of reciprocals occurs frequently where equations are convertible to reciprocal form, and to this end the lines $R_1$ through $R_{10}$ radiate from the point of intersection of the scale $D^1$ with base line 12. The angle of radiation is predetermined so as to effect the proper values attributed to the radiating lines respectively, as is illustrated. The use of these reciprocal lines is later described.

The linear nomogram at face 10 also includes the inscription thereon of power lines $P_1$ through $P_3$ superimposed upon a grid 16 calibrated to the powers of $2^n$, $3^n$ and $4^n$, and constructed between the base lines 12 and 13. The lines $P_1$ through $P_3$ radiate from the point of intersection of the scale $D^1$ with the base line 12, and each line $P_1$ through $P_3$ is of predetermined curvature so as to effect the proper value attributed to each line respectively, as illustrated. The grid 16 and associated power lines $P_1$ through $P_3$ cooperate with and establish a read-out on scale $D^1$ as is later described.

In accordance with the invention the calculating line B is adapted to be manipulated so as to extend in omnidirections over the face 10 and/or face 11. In its preferred form, calculating line B is incorporated in a case 20 characterized by its transparent sides 21 and 22 which protect the faces 10 and 11 while visibly exposing the same. Consequently, the case 20 is coextensive with the instrument body A, the sides being oppositely disposed to overlie the faces 10 and 11 respectively, and joined in spaced relation for sliding frictional engagement of the body A therebetween. As above described, the body A is elongated in which case the case 20 is joined at its ends with headers 23 having opposed arcuate faces 24 formed about a common center and engaged by complementary arcuate ends 25 on body A also formed about a common center, said centers being coincidental when the body A is revolved into position between said headers 23. The sides of the case remain open for insertion and revolvement of the body A. The line B, or multiplicity thereof as shown, is inscribed in the transparent side 21 and 22, extending longitudinally (and at appropriately useable angles) so as to be manipulated into placements as circumstances require.

The memory indicators C are provided for selective location along the scales $D^1$, $D^2$, $L^1$, $L^2$ and M. As shown, the memory indicators C are flush with the planar surfaces of the body A and each is a transparent solid having a tapered body 30 slideably and frictionally captured in a dove-tailed channel 31 to move adjacent the scale to which it is related. There can be several indicators C in each channel 31, and the manual engagement for positioning thereof is through a fingernail slot 32 comprised of at least one straight line or shoulder that extends transversely of the indicator and by which it is moved. A feature of the invention is the provision of access openings 35 in the sides 21 and 22, and through which a person's finger gains access for said fingernail engagement while simultaneously manipulating the calculating line B. In practice, the said calculating line B terminates at said openings 35, whereby the indicators C can be locked coincidentally with the read-out attained by positioning of said line B.

Figure 7:
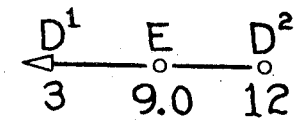

The linear nomogram is utilitarian through the selective movement and placement of the calculating line B over the body A, the calculating line B being in all instances a straight line that intersects the scales $D^1$, $D^2$ and E and the lines F, $R_1$ through $R_{10}$ and lines $P_1$ through $P_3$ at read-off points. The fundamental mathematical problems are performed by manipulation of the calculating line B generally as follows:

Problems of addition are performed, for example in several ways. A first example is for extreme simplicity to solve 7 + 5; the calculating line B being placed to intersect scale $D^1$ at 7 and to intersect scale E at the number 5, in which case the answer of 12 is read at the intersection of calculating line B with the scale $D^2$. In FIG. 6 of the drawings I have shown the shorthand notation that I prefer to employ when operating the instrument herein disclosed, as applied to the above first example, and wherein the scales are designated by indicia related as they are on the instrument and with the variable and answer values disposed in close relation (beneath) to the indicia reference of the scales. In order to differentiate known variables from the answer and in order to distinguish addition from subtraction, a pointed directional line (left to right) terminates at a reference X which is the answer, the other known variables being designated as references O along said line. A second example is to solve the addition of more than two numbers or groups of numbers and complicated by subtraction, for instance (7.5 + 4.5) − ( 2.5 + 6.5). In this instance the problem is solved by grouping and relating the group answers; the calculating line B being used the same as above in solving 7.5 plus 4.5 which equals 12.0, and solving 2.5 plus 6.5 which equals 9.0, utilizing memory indicators C and followed by reversal of the process for subtraction purposes as shown in FIG. 7 (directional line right to left) wherein the answer of the second group is subtracted from the first group, namely 12 − 9 which equals 3. Notice that calculating bar B is placed to intersect scale $D^2$ at 12 and scale E at 9, so as to read the answer of 3 at the scale $D^1$.

Figure 8:
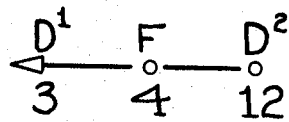
Figure 9:
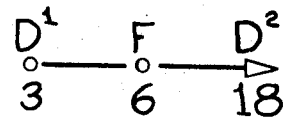

Problems of multiplication and division are performed with the linear scales $D^1$ and $D^2$ on the face 10 by utilizing the proportionate scale F (scale E being ignored), for instance $\frac{12}{4} = X$; the calculating line B being placed to intersect $D^2$ at 12 and to intersect scale F at 4, in which case the answer of 3 is read at the intersection of calculating line B with the scale $D^1$. Notice from FIG. 8 that the shorthand notation operates from right to left. Conversely, when solving multiplication problems, for instance $3 \times \frac{6}{2} = 9$; the shorthand notation is from left to right as shown in FIG. 9, reversal in the sequential out of scales as compared with division as described, however, the memory indicator C is used to retain the answer 18 on the $D^2$ scale, followed by placing the calculating line B to intersect the same and the value 2 on the F scale, and with the result that the read-out is 9 on the $D^1$ scale.

Figure 10:
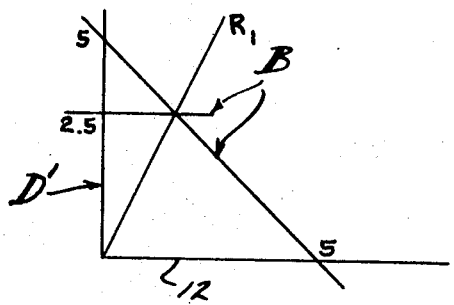
Figure 11:
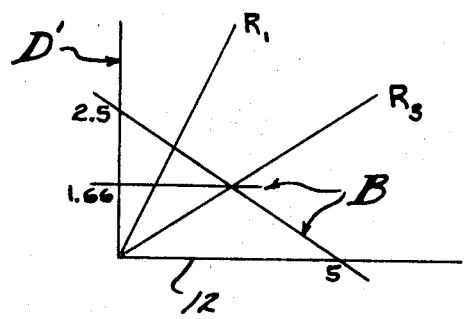
Figure 12:
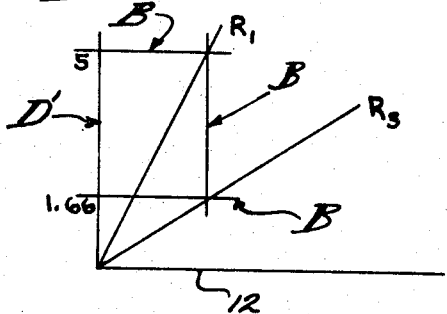

Problems involving reciprocals are performed on face 10 with the linear scale $D^1$ by utilizing the reciprocal lines $R_1$ through $R_{10}$ according to their proportionate ratios as is indicated by their respective numerical references. For example, the problem $$\frac{1}{C} = \frac{1}{5} + \frac{1}{5} + \frac{1}{5} = \frac{1}{1.66};$$

firstly the calculating line B is placed to intersect scale $D^1$ and base line 12 at the values 5 and 5 respectively, see FIG. 10, followed by revolving the line B on its intersecting point with the reciprocal line $R_1$ having the ratio of "one," so as to be parallel with base line 12 and normal to scale $D^1$, the first addition answer being read out as 2.5 at the intersection of line B with the $D^1$ scale. or $\frac{1}{2.5}$. Secondly the above operation is repeated in solving the second addition, by placing the calculating line B to emanate from the said first answer of 2.5 on the $D^1$ scale and again intersecting the 5 on the base line 12 scale, followed by rotation of the line B to said parallelism and read-out of the final answer 1.66 on the $D^1$ scale, see FIG. 11, or $\frac{1}{1.66}$. A direct operation of the instrument for attainment of the same answer is shown in FIG. 12, by simultaneously utilizing the reciprocal $R_1$ and $R_3$, there being three functions involved, and whereby the answer of 1.66 is available in one cycle of operation; firstly the calculating line B is placed to intersect scale $D^1$ at the value 5 and disposed parallel to base line 12 to intersect reciprocal $R_1$ followed by revolving the line B on its intersecting point with reciprocal line $R_1$ so as to be parallel with scale $D^1$ (and normal to base line 12) to intersect reciprocal $R_3$, followed by again revolving the line B on its intersecting point with reciprocal $R_3$ so as to be parallel with base line 12 and again intersecting scale $D^1$ and read-out of the final answer 1.66 thereon, or $\frac{1}{1.66}$.

Problems involving roots and powers are performed on face 10 and cooperatively related to continued solutions emanating from the scale $D^1$, for example the problem $3^2 + 8 = 17$. In this instance the calculating line B is placed to project parallel with scale $D^1$ from the value 3 on the grid 15, as scaled on base line 12, placing the memory indicator C followed by revolving the line B on its intersecting point with the power line $P_2$ (the squared root line), so as to be parallel with base line 12, the first answer being read as 9 on the $D^1$ scale. As shown, the memory indicator is made of transparent material, and the grid 15 is inscribed at the bottom of the channel 31. The first answer is retained and immediately followed by addition of 8 as hereinabove described. The answer is 17.

The logarithmic nomogram at face 11 accommodates a wide variety of mathematical problems and equations involving multiplication, division and exponential equations. The scales $L^1$, $L^2$ and M are divided into proportionate ratio increments of a power to which it is necessary to raise a fixed base number to produce a given antilogarithmic number; scale $L^1$ increasing numerically as it extends from base line 12 to base line 13 and scale $L^2$ increasing numerically as it extends from base line 13 to base line 12. The dual range control scale M is one continuous scale as it extends from the base line 12 to base line 13 covering twice the range of scales $L^1$ and $L^2$. As shown, the scales are decimal, and in accordance with the invention a proportionate exponent scale X is extended from the base line 12 at scale $L^1$ to base line 13 at scale $L^2$, being graduated substantially the same as scale F, increasing numerically from zero at base line 12 and the zero of scale $L^1$ to a value of 1 at the intersection with control scale M, and to a value of infinity at base line 13 and the zero of scale $L^2$.

A feature of the logarithmic nomogram at face 11 is the manifolded configuration thereof wherein thereof is continuity into adjacent nomogram areas $a$, $b$ and $c$, and wherein said adjacent areas have common base lines 12 and 13 as shown. Therefore and in accordance with the invention, exponent control scales $X_1$ and $X_2$ radiate from the base line 12 at the intersection of scale $L^1$ at the lowermost area $a$, to line 13 of area $b$ and area $c$, respectively. In each instance the length of said exponent control line X, $X_1$ and $X_2$ is graduated in increments related in parallel to the above-described scale X, as shown.

The logarithmic nomogram is utilitarian through the selective movement and placement of the calculating line B over the body A, the calculating line B being in all instances a straight line that intersects the scales $L^1$, $L^2$ and M and the exponent lines X, $X_1$ and $X_2$ at read-off points. The fundamental mathematical problems are performed by manipulation of the calculating line B generally as follows:

Problems of multiplication are performed, for example $3 \times 4 = 12$ by placing the calculating line B to intersect scale $L^1$ at 3 and to intersect scale M at 4, in which case the answer of 12 is read at the intersection of calculating line B with the scale $L^2$. Conversely, division is operated from right to left, the 3 as denominator being at $L^1$ and the answer of 4 reading at scale M.

Problems involving exponents are performed on face 11 by utilizing the exponent lines X, $X_1$ and $X_2$ to solve, for example, the problem $3^2 \times 9$. For instance the calculating line B is placed to intersect scale $L^2$ at 3 and to intersect scale X at 2, in which case the answer of 9 is read at the intersection of calculating line B with the scale $L^1$. Advantage can be taken of the angular relation of the several lines X, $X_1$ and $X_2$ in order to increase accuracy in the answer, avoiding acute intersections, simply by accounting for proper placement of the decimal point in the answer.

In addition to the foregoing, quadratic equations are solved on face 11 of the instrument, utilizing the exponent scales X, $X_1$ and $X_2$ as they relate to the log scales $L^1$ and $L^2$, and to the scale M. For example problems such as $(X^2 + 0.75)(X^3 - 13.625) = 14.0$.

From the foregoing it will be seen that a very practical and highly useful instrument is provided whereby mathematics is conducted with facility by the use of nomograms made up of uniquely arranged scales that remain fixedly positioned and relative to which calculating lines and memory indicators are moved. The instrument is not restricted to the addition of values on logarithmic scales and includes the linear scales to the end that straight addition and subtraction is made possible, and as well the functions that are inherent by the inclusion of reciprocal and exponent lines and/or scales, all according to the general uses hereinabove described.

Having described only a typical preferred form and application of my invention, I do not wish to be limited or restricted to the specific details herein set forth, but wish to reserve to myself any modifications or variations that may appear to those skilled in the art.

I claim:

1. An instrument for numerical calculation and comprising, a body having ends and inscribed with a pair of spaced and parallel scales of preselected variables extending coextensively between spaced and parallel base lines normal to said scales and with a control scale intermediate the first-mentioned pair of scales and extending between said base lines, and a case with a transparent side and with end headers engaging over the ends of the body for insertion of the body laterally into the case, and a calculating line inscribed in the transparent side of the case for omniplacement intersecting the said three scales, whereby a dependent variable is read off on one scale as a result of placement at selected variables on the other two scales respectively.

2. The instrument as set forth in claim 1, wherein said pair of scales are identical and invertedly related.

3. The instrument as set forth in claim 1 and which includes a manually movable memory indicator frictionally captured to the body by means for placement along at least one of said scales.

4. The instrument as set forth in claim 1 and wherein the said control scale is a divided scale disposed parallel to and midway between the first-mentioned pair of scales and extending coextensively therewith between said base lines.

5. The instrument as set forth in claim 1, wherein the scales are graduated linearly in equal increments, and wherein the said control scale is a divided scale disposed parallel to and midway between the first-mentioned pair of scales and extending coextensively therewith between said base lines.

6. The instrument as set forth in claim 1, wherein the scales are graduated linearly in equal increments and the said control scale being graduated at half scale as compared with the first-mentioned identical scales, wherein the said control scale is a divided scale with its graduations increasing in value from its midpoint, and wherein said control scale is disposed parallel to and midway between the first-mentioned pair of scales and extending coextensively therewith between said base lines.

7. The instrument as set forth in claim 1 and wherein the said control scale is a reciprocal line disposed diagonally as it extends longitudinally of and between the first-mentioned pair of identical scales.

8. The instrument as set forth in claim 1 and wherein the said control scale is a reciprocal scale disposed diagonally to extend between the opposite zero points of the first-mentioned pair of identical scales respectively.

9. The instrument as set forth in claim 1, wherein the said control scale is a reciprocal scale disposed diagonally to extend between the opposite zero points of the first-mentioned pair of identical scales, and wherein said control scale is logarithmically graduated from zero at the zero point of one of said identical scales, through the value of one at its midpoint, to the value of infinity at the zero point of the other of said identical scales.

10. The instrument as set forth in claim 1 and wherein there is a family of control scales and each of which is a reciprocal line disposed diagonally to extend from the zero point of one of the first mentioned pair of identical scales and each with an angle of radiation determining a reciprocal value.

11. The instrument as set forth in claim 1 and wherein there is a family of control scales, each of which is a reciprocal line disposed diagonally to extend from the zero point of one of the first-mentioned mentioned pair of identical scales, one of which is disposed diagonally between opposite zero points of the first mentioned pair of scales, and each of said reciprocal lines being at an angle of radiation determining a reciprocal value.

12. The instrument as set forth in claim 1 and which includes a manually movable memory indicator frictionally captured to the body by means for placement along at least one of said scales, and wherein there is an opening in the side of the case for manual access to the memory indicator while placing the calculating line.

13. The instrument as set forth in claim 1, wherein said pair of scales are identical and invertedly related scales and wherein said control scale is a dual range logarithmic scale intermediate the first mentioned pair of scales.

14. The instrument as set forth in claim 13 and which includes a manually movable memory indicator frictionally captured to the body by means for placement along at least one of said scales.

15. The instrument as set forth in claim 13 and wherein an exponent scale is disposed diagonally to extend between opposite zero points of the first mentioned pair of identical scales respectively.

16. The instrument as set forth in claim 13 and which includes nomogram areas next adjacent to said pair of scales and said control scale and superimposed with the scales thereof aligned end to end and joined decimally at common base lines.

17. The instrument as set forth in claim 13, wherein there are nomogram areas next adjacent to said pair of scales and said control scale and superimposed with the scales thereof aligned end to end and joined decimally at common base lines, and wherein an exponent scale is disposed diagonally from a common zero point at the lowermost base line at one of said first-mentioned scales to each base line of the superimposed areas respectively.

18. An instrument for numerical calculation and comprising, a body inscribed with a pair of spaced and parallel scales of preselected variables extending coextensively between spaced and parallel base lines normal to said scales and with a control scale intermediate the first mentioned pair of scales and extending between said base lines, and a case with a transparent side and with end headers engaging over the arcuate ends of the body for insertion of the body laterally into the case, a calibrated grid of numerical values adjacent one of said identical scales and inscribed with a power line having a root value related to numerical values on said grid, and a manually movable calculating line inscribed in the transparent side of the case for omniplacement intersecting the said three scales, the grid and the said power line, whereby a dependent variable is read off on said identical scale adjacent the grid as a result of placement at a selected variable on said grid and power line respectively and whereby a subsequent dependent variable is read off on the other of said first-mentioned scales as a result of placement of the calculating line at a variable on the control scale as related to the first attained dependent variable.

19. The instrument as set forth in claim 18 and which includes a manually movable memory indicator frictionally captured to the body for placement along the first-mentioned identical scale adjacent the said grid.